United States Patent Office 3,213,138
Patented Oct. 19, 1965

3,213,138
N,N-DISUBSTITUTED-N'-PHENYLALKYL
HYDRAZINES
John H. Biel, Milwaukee, Wis., assignor, by mesne assignments, to Colgate-Palmolive Company, a corporation of Delaware
No Drawing. Filed Dec. 18, 1958, Ser. No. 781,190
8 Claims. (Cl. 260—569)

This invention relates to hydrazine derivatives. More particularly, this invention is concerned with N,N-disubstituted-N'-phenylalkyl hydrazines and the use of these compounds as psychotherapeutic agents. The invention is also concerned with novel pharmaceutical compositions containing an N,N-disubstituted-N'-phenylalkyl hydrazine.

This application is a continuation-in-part of my copending applications Serial No. 605,724, filed August 23, 1956, and Serial No. 716,875, filed February 24, 1958, both now abandoned.

It has been discovered, according to the present invention, that N,N-disubstituted-N'-phenylalkyl hydrazines have psychotherapeutic activity. The N,N-disubstituted-N'-phenylalkyl hydrazines which possess such activity, and are thus psychotherapeutic agents, have the formula:

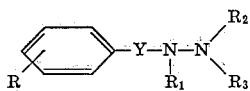

FORMULA I wherein R is hydrogen or one or more substituents on the phenyl group such as alkyl groups and particularly methyl, ethyl, propyl, butyl or the like, an alkoxy group such as methoxy, ethoxy, propoxy or the like, an aryl group such as the phenyl group, an aralkyl group and particularly a phenylalkyl group such as the benzyl group, a phenyl-alkoxy group such as phenylmethoxy and including the phenoxy group, the hydroxy group, polyalkoxy substituents such as dimethoxy and trimethoxy substituents, a lower alkylenedioxy group such as the methylenedioxy group, a halogen such as bromine or chlorine, and dihydroxy substituents, $R_1$ is hydrogen, an alkyl group such as methyl, ethyl, isopropyl and the like or an aralkyl group such as benzyl and phenethyl, $R_2$ and $R_3$ represent the same or different groups of the group consisting of alkyl groups and particularly the lower alkyl groups such as methyl, ethyl, propyl, butyl, isopropyl, pentyl, hexyl and the like, hydroxalkyl groups such as the hydroxyethyl group, alkenyl groups such as lower alkenyls and specifically the allyl and 1-(2-butenyl) groups, aryl groups and particularly monocyclic aryl groups such as the phenyl group and nuclear substituted phenyl groups such as the hydroxyphenyl, methoxyphenyl, chlorophenyl and acetoxyphenyl groups, aralkyl groups and particularly phenyl-lower alkyl groups such as the benzyl, phenethyl, phenylisopropyl and p-chlorophenylbutyl groups, cycloalkyl groups such as the cyclopentyl and cyclohexyl groups, alkynyl groups such as propargyl, butynyl and the like, the 2-thienylmethyl group and the pyridylmethyl group, and groups in which

represents a cyclic secondary amino group such as the morpholino, pyrrolidino, piperidino, 1,2,3,4-tetrahydroisoquinolino, 1,2,3,4-tetrahydroquinolino, isoindolino, 4-lower alkyl-1-piperazino, hydroxypiperidino, indolino, theophyllino and phenothiazino groups, and Y is a straight or branched alkylene group from 1 to 12 carbons, although advisably of 5 or less carbons, such as the following:

(a) $CH_2CH_2CH(CH_3)CH_2$, 3-methylene
(b) $CH(CH_3)$, 1-methylmethylene
(c) $CH(CH_3)CH_2$, 1-methylethylene
(d) $CH_2CH_2CH_2$, propylene
(e) $CH_2CH(CH_3)$, 2-methylethylene
(f) $CH(CH_3)CH_2CH_2$, 1-methylpropylene
(g) $CH_2CH(CH_3)CH_2$, 2-methylpropylene
(h) $CH_2CH_2CH(CH_3)$, 3-methylpropylene The compounds of Formula I are potent monoamine oxidase inhibitors and central nervous system stimulants useful for psychotherapeutic treatment of depressed mental states.

The most potent monoamine oxidase inhibitors of Formula I are those in which Y has no more than three carbons between the phenyl and hydrazine moieties and in which $R_1$ is hydrogen.

In Table I following there is given in vivo data on the monoamine oxidase inhibitory activity, as well as $LD_{50}$ values and analeptic date, for representative compounds of this invention, as well as in vitro data for iproniazid.

The in vitro monoamine oxidase inhibition data was obtained using the procedure described by Horita in his publication in the J. Pharm. and Exper. Therap. 122, 176 (1958). In this test, homogenates of rat liver and brain were prepared, some of which were used as untreated controls while the compounds to be tested were added to other portions of the homogenates. The metabolism of serotonin (5-hydroxytryptamine) to 5-hydroxyindole acetic acid in both the controls and the treated homogenates was measured over a 30 minute period. The reduction in metabolism of serotonin in the treated homogenates compared to the controls is reported as the percent inhibition.

The in vivo monoamine oxidase inhibitory activity was determined using the procedure reported by Chessin et al. in the J. Pharm. and Exper. Therap. 119, 453 (1957). This test is based on the reversal effect which monoamine oxidase inhibitors have on reserpine treated animals. Normally an animal treated with reserpine shows a sedative effect. However, if pretreated with a monoamine oxidase inhibitor, the animal will show a pronounced stimulatory effect when administered reserpine. This is called reserpine reversal. In carrying out the test, the compound to be studied is injected at a threshold concentration into a series of mice at various doses intraperitoneally and two hours later 5 mg./kg. of reserpine is injected intraperitoneally. The lowest dose at which the animals show excitation is selected for the value used in the table which is expressed using iproniazid as 1. The higher the number the more active is the compound.

TABLE I

| Compound (φ=phenyl) | | In Vitro Percent Inhibition Concentration of Inhibitor | | In Vivo Activity Iproniazid-1 | LD$_{50}$, mg./kg. (S.C. mice) | Analeptic,* mg./kg. |
| --- | --- | --- | --- | --- | --- | --- |
| | | 10$^{-6}$M | 10$^{-5}$M | | | |
| 1 | Iproniazid | 0 | 25 | 1 | | |
| 2 | 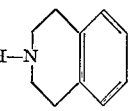 | | | 8 | 109 | 15 |
| 3 | 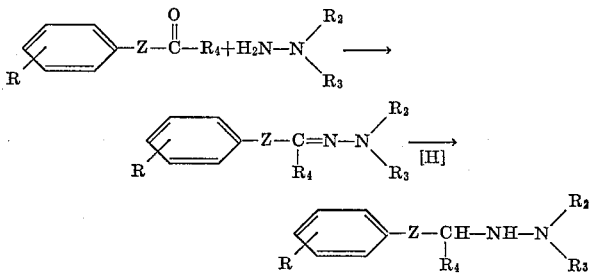 | | | 2 | | None |

*Arousal from reserpine stupor.

These N,N - disubstituted - N' - phenylalkyl hydrazines also stimulate the heart muscle and are thus useful for the treatment of shock.

These compounds are also useful in treating angina pectoris and arthritis.

Compounds of Formula I in which R$_1$ is hydrogen may be conveniently produced by the process which comprises reacting an N,N-disubstituted hydrazine with a phenylalkylaldehyde or a phenylalkyl-alkyl-ketone to form an intermediate hydrazone which is then reduced to the desired hydrazine. This process may be represented as follows:

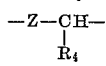

wherein R, R$_2$ and R$_3$ have the significance previously assigned, Z is a straight or branched lower alkylene group, R$_4$ is hydrogen or a lower alkyl group, and $$-Z-\underset{R_4}{CH}-$$

is equivalent to Y.

Some of the phenylalkyl aldehydes and phenylalkyl alkyl ketones which may be used in this process are phenylacetaldehyde, 2-phenylpropionaldehyde, p-chlorophenylbutyraldehyde, 3,4-methylenedioxyphenylvaleraldehyde, phenylacetal, p-hydroxyphenylacetaldehyde, phenylethyl ethyl ketone, phenylbutyl ethyl ketone, 2-phenylpropyl propyl ketone, phenylethyl methyl ketone, benzaldehyde, p-chlorobenzaldehyde, acetophenone, propiophenone, butyrophenone, benzophenone, benzylphenone, phenethylphenone, and 3,4-methylenedioxyphenyl ethyl ketone and the like.

Some of the N,N-disubstituted hydrazines which may be used in the process are N,N-dimethylhydrazine, N,N-diethylhydrazine, N,N-dibenzylhydrazine, N,N-diphenylethylhydrazine, N-methyl-N-ethylhydrazine, N,N-diallylhydrazine, N,N-dipropargylhydrazine, N,N-diphenylhydrazine, N,N-dihydroxyethylhydrazine, N,N-dicyclohexylhydrazine, N - amino - 1,2,3,4 - tetrahydroisoquinoline, N - amino - pyrrolidine, N - amino - tetrahydroisoindoline, N-amino-morpholine and N-amino piperidine. My copending application Serial No. 681,189, filed August 30, 1957, now U.S. Patent No. 2,932,646, granted April 12, 1960, discloses the preparation of some of these compounds.

Reaction between the phenylalkyl alkyl ketone or aldehyde and the hydrazine is conveniently effected by contacting the reactants in the presence of water or a lower alcohol. The reaction proceeds at room temperature although slightly elevated temperature may be employed to increase the rate of reaction. Recovery of the intermediate phenylalkylidenyl hydrazine, or hydrazone, is conveniently effected by conventional methods. Thus, the product, generally an oil as the free base, may be salted out with an alkali metal hydroxide and extracted with a water immiscible organic solvent such as ether. The product is readily isolated by distillation under reduced pressure.

The intermediate hydrazone may be reduced to the corresponding hydrazine by use of a suitable reducing agent. Lithium aluminum hydride is the preferred reducing agent although catalytic hydrogenation also may be employed. With lithium aluminum hydride, the reduction may be conveniently effected by intimately combining the reactants in an inert organic solvent such as anhydrous ether, dioxane, or tetrahydrofuran. Elevated temperatures such as the reflux temperature enhance the reaction. At reflux temperature, from 1 to 8 hours is usually sufficient to substantially complete the reaction. After the reaction is terminated water may be added to the mixture to decompose excess lithium aluminum hydride. To recover the product, the organic phase is separated and the aqueous residue extracted with the same solvent. The organic phase and extracts then may be combined, dried, and the product distilled.

Catalytic reduction may also be used satisfactorily using catalysts such as rhodium, platinum oxide, palladium and the like in solvents such as tetrahydrofuran, water, ethyl acetate and dioxan. Raney nickel is not a particularly suitable catalyst since undue cleavage occurs. Hydrogen pressures of about 50 to 3000 p.s.i may be used. The temperature of reduction may be room temperature or increased temperatures such as up to 80° C.

Some of the hydrazines produced in this way are N,N-dimethyl - N' - phenylethyl hydrazine, N,N - diphenyl-N'-phenylpropyl hydrazine, N,N-dibenzyl-N'-phenylbutyl hydrazine, N,N - dicyclohexy - N' - phenylhexyl hydrazine, N,N - dially-N'-benzyl hydrazine, N,N - dihydroxyethyl-N' - phenylpropyl hydrazine, N - methyl-N-ethyl-N'-phenylethyl hydrazine, N - [N' - (1-phenyl-2-propyl)]-amino-1,2,3,4 - tetrahydroquinoline, N-[N'-(1 - phenyl - 3 - propyl)]-amino - piperidine, N-(N' - benzyl)amino - pyrrolidine, N-[N'-(1-phenyl - 4 - pentyl)]-amino-morpholine, N,N - dimethyl-N'-[1 - (p - chlorophenyl)-2-propyl]-hydrazine, N,N - dibenzyl-N'-[1-(o-hydroxyphenyl)-2-propyl]-hydrazine, N,N - diethyl - N' - (1-phenyl-3-propyl)-hydrazine, and N,N-dially-N'-[1-(p - methylphenyl) - 2 - propyl]-hydrazine.

These hydrazines may be converted to the compounds of Formula I in which $R_1$ is an alkyl or aralkyl group by the process of reductive alkylation employing a formaldehyde-formic acid mixture or an alkyl or aralkyl acyl halide to form an intermediate acyl hydrazine and reducing the acyl group to an alkyl or alkylene group. This process may be represented as follows:

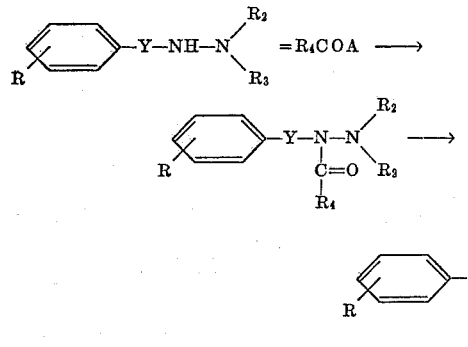

wherein R, $R_2$, $R_3$ and Y have the significance previously assigned, $R_4$ is hydrogen, an alkyl or aralkyl group and A is hydrogen, a reactive halogen such as bromine, chlorine or iodine or a lower alkoxy group.

In addition to the formaldehyde-formic acid mixture which can be used to introduce a methyl group for $R_1$, in Formula I, one may also use an alkyl formate to introduce the formyl group which then may be reduced as by platinum and hydrogen, or lithium aluminum hydride, to the methyl group.

Other esters or acyl halides may also be used to introduce the intermediate acyl group. Some such reactants which may be used are acetylchloride, propionylbromide, benzoylchloride, phenylacetylchloride, ethyl phenylacetate, phenylpropionylchloride, methylacetate and the like.

The acylation reaction is effected by contacting the reactants in an inert solvent such as ether or tetrahydrofuran and refluxing the mixture. Reduction of the intermediate acyl hydrazine is readily effected without isolation of the acyl compound by use of lithium aluminum hydride or catalytic hydrogenation.

Some of the compounds produced in this way are N,N-dimethyl-N'-methyl-N'-phenylethyl hydrazine, N,N-diphenyl - N' - propyl-N'-phenylpropyl hydrazine, N,N-dibenzyl - N' - benzyl - N' - phenylbutyl hydrazine, N,N-diphenylethyl - N' - ethyl-N-(3-p-hydroxyphenyl-2-propyl)-hydrazine and N,N-dipropyl-N'-propyl-N'-(1-phenyl-2-propyl)hydrazine.

The described hydrazines are advisably employed in the described uses in the form of nontoxic acid addition salts such as the hydrochloride, hydrobromide, phosphate, fumarate and sulfate.

Quaternary ammonium salts such as the dimethyl sulfate, methyl chloride, ethyl bromide and methyl iodide are readily prepared from the hydrazones and hydrazines.

The N,N-disubstituted-N'-phenylalkyl hydrazines may be administered to animals as pure compounds. It is advisable, however, to first combine one or more of the novel compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administration or, instead, the powders may be added to suitable foods and liquids, including water, to facilitate administration.

The powders also may be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the N,N-disubstituted-N'-phenylalkyl hydrazines, advisably as a nontoxic acid addition salt, and may be administered one or more at a time at regular intervals. Such unit dosage forms, however, should generally contain a concentration of 0.1% to 10% by weight of one or more of the active hydrazines.

Dosages of from about 1 mg. to 50 mg. may be administered to obtain the stated activities. However, the recommended dosages are from 3 to 12 mg. daily. Larger dosages may be administered on an interrupted schedule but generally not more than 50 mg., and preferably not more than 25 mg., is administered daily. The dosage must obviously be chosen with a view to obtaining the desired results without adverse side effects which might occur with some of the compounds.

A typical tablet may have the composition:

| | Mg. |
|---|---|
| 1. N,N-dimethyl-N'-phenylisopropyl hydrazine HCl | 10 |
| 2. Starch, U.S.P. | 57 |
| 3. Lactose, U.S.P. | 73 |
| 4. Talc, U.S.P. | 9 |
| 5. Stearic acid | 6 |

Powders 1, 2 and 3 are slugged, then granulated, mixed with 4 and 5, and tableted.

Capsules may be prepared by filling No. 3 hard gelatin capsules with the following ingredients, thoroughly mixed:

| | Mg. |
|---|---|
| 1. N,N - dimethyl - N' - phenylisopropyl hydrazine HCl | 5 |
| 2. Lactose, U.S.P. | 200 |
| 3. Starch, U.S.P. | 16 |
| 4. Talc, U.S.P. | 8 |

The oral route is preferred for administering the active N,N-disubstituted-N'-phenylalkyl hydrazines.

The action of barbiturates is also potentiated by these compounds by prolonging sleeping time several fold. The compounds are also powerful nasal decongestants and do not lose their effectiveness after repeated administration.

The following examples illustrate methods of making the compounds.

EXAMPLE 1

N,N-dimethyl-N'-(1-phenyl-2-propylidenyl)-hydrazine

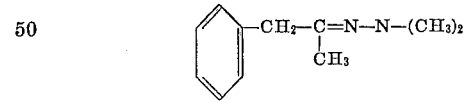

To 108 g. N,N-dimethylhydrazine dissolved in 500 cc. of methanol was added 120.8 g. of methylbenzylketone at 15–20° C. The reaction mixture was then allowed to stand at room temperature for 20 hours. The methanol was removed by distillation and the product collected at 67° C. (0.15 mm.); $N_D^{20}$ 1.5185; yield 144 g. (91%).

Analysis.—Calcd. for $C_{11}H_{16}N_2$: N, 15.90. Found: N, 15.86.

EXAMPLE 2

N,N-dimethyl-N' (1-phenyl-2-propyl)-hydrazine

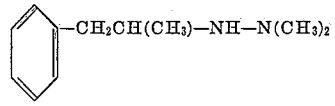

The propylidene base of Example 1 was reduced according to the directions described, using 7.5 g. of glacial acetic acid, 75 cc. of ethanol and 0.3 g. of platinum oxide catalyst and hydrogen at 60 lbs. p.s.i. and room temperature. The catalyst was removed by filtration, the solvent distilled off and the residue dissolved in water.

A saturated aqueous potassium hydroxide solution was added to the residue and the mixture extracted with ether. The ether extracts were dried with potassium carbonate and the product collected by distillation; yield 73%; B.P. 60° C. (0.35 mm.); $N_D^{20}$ 1.5185.

*Analysis.*—Calcd. for $C_{11}H_{18}N_2$: N, 15.72. Found: N, 15.78.

EXAMPLE 3

*N-phenylisopropyl-N',N'-dimethylhydrazine methobromide*

To 2.85 g. of methylbromide in 25 cc. of acetonitrile was added 3.6 g. of the base of Example 2. Upon the addition of ether an oil precipitated which crystallized on standing. The crystalline precipitate was separated by filtration, yield 3.8 g., M.P. 152–154° C.

*Analysis.*—Calcd. for $C_{12}H_{21}BrN_2$: Br, 29.25. Found: Br, 29.54.

EXAMPLE 4

*N-phenylisopropyl-N',N'-dimethylhydrazine hydrochloride*

Prepared in a mixture of isopropyl alcohol-ether, M.P. 128° C.

*Analysis.*—Calcd. for $C_{11}H_{19}ClN_2$: Cl, 16.51. Found: Cl, 16.52.

EXAMPLE 5

*N-amino-1,2,3,4-tetrahydroisoquinoline*

To a mixture of 26.6 g. (0.20 mole) of 1,2,3,4-tetrahydroisoquinoline and 170 cc. of water was added 51 g. of 30% sulfuric acid. The solution was then cooled and, while stirring, a solution of 34 g. (0.49 mole) of sodium nitrite in 60 cc. of water was added in 25 minutes at 5–10° C. Stirring was continued for another 2 hours at room temperature. The solution was then extracted with ether and the ethereal extracts washed with 50 cc. of 40% potassium hydroxide solution. The ethereal extracts were dried over potassium carbonate, filtered, and the ether was removed by distillation. The residue, consisting of 29 g. of crude 2-nitroso-1,2,3,4-tetrahydroiosquinoline, was dissolved in 400 cc. of ether and the ethereal solution was added in a dropwise fashion to a suspension of 8.8 g. (0.23 mole) of lithium aluminum hydride in 400 cc. of refluxing dry ether. Stirring was continued for 4 hours after which the hydride complex was decomposed by addition of 40% potassium hydroxide. The reaction mixture was extracted with ether. The ethereal extracts were dried with potassium carbonate, filtered, and fractionated. The product was collected at 85° C. (0.5 mm.), yield 21.7 g. (73%), $N_D^{20}$ 1.5793.

*Analysis.*—Calcd. for $C_9H_{12}N_2$: N, 18.90. Found: N, 18.70.

EXAMPLE 6

*N-[N'-(1-phenyl-2-propylidenyl)]-amino-1,2,3,4-tetrahydroisoquinoline*

A solution of 37.1 g. (0.25 mole) of N-amino-1,2,3,4-tetrahydroisoquinoline in 150 cc. of alcohol was added to a solution of 33.5 g. (0.25 mole) of phenylacetone in 150 cc. of alcohol. The solution was refluxed for 3 hours and the alcohol was removed by distillation. The residue was extracted with ether and dried with potassium carbonate. The carbonate was filtered off and the compound was isolated by fractionation; 55.6 g. (84%) was collected at 152° C. (0.35 mm.), $N_D^{20}$ 1.5858.

*Analysis.*—Calcd. for $C_{18}H_{20}N_2$: N, 10.60. Found: N, 10.76.

EXAMPLE 7

*N-[N'-(1-phenyl-2-propyl)]-amino-1,2,3,4-tetrahydroisoquinoline*

A solution of 26.4 g. (0.10 mole) of N-[N'-(1-phenyl-2-propylidenyl)]-amino-1,2,3,4-tetrahydroisoquinoline in 175 cc. of dry ether was added in a dropwise fashion to a suspension of 3.4 g. (0.09 mole) of lithium aluminum hydride in 200 cc. of dry ether. The reaction mixture was refluxed and stirred for 5 hours after which the hydride complex was decomposed by addition of potassium hydroxide solution. The mixture was extracted with ether, the ethereal solution was dried with potassium carbonate, filtered and fractionated. The product was collected at 135° C. (0.15 mm.), yield 22.5 g. (84%), $N_D^{20}$ 1.5674.

*Analysis.*—Calcd. for $C_{18}H_{22}N_2$: N, 10.52. Found: N, 10.62.

The hydrochloride salt melted at 221° C.

*Analysis.*—Calcd. for $C_{18}H_{23}ClN_2$: Cl, 11.71; N, 9.26. Found: Cl, 11.65; N, 9.16.

Various changes and modifications of the invention can be made and, to the extent that such variations incorporate the spirit of this invention, they are intended to be included within the scope of the appended claims.

What is claimed is:

1. A compound of the group consisting of compounds of the formula

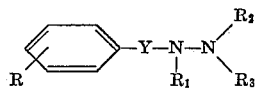

and salts with nontoxic acids, wherein R is at least one member of the group consisting of hydrogen, lower alkyl, hydroxy, methylenedioxy and halogen, $R_1$ is a member of the group consisting of hydrogen, lower alkyl and phenyl-lower alkyl, $R_2$ is a member of the group consisting of lower alkyl, hydroxy-lower alkyl, lower alkenyl, lower alkynyl, phenyl, phenyl-lower alkyl, cyclopentyl and cyclohexyl, $R_3$ is a member of the group consisting of lower alkyl, hydroxy-lower alkyl, lower alkenyl, lower alkynyl, phenyl, cyclopentyl and cyclohexyl and the group

also represents a member of the group consisting of morpholino, pyrrolidino and piperidino, but $R_3$ is not lower alkyl when $R_2$ is phenyl-lower alkyl, and Y is a member of the group consisting of lower straight and branched alkylenes having at least two carbons.

2. A compound of the group consisting of compounds of the formula

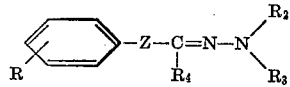

and salts with nontoxic acids, wherein R is at least one member of the group consisting of hydrogen, lower alkyl, hydroxy, methylenedioxy and halogen, $R_2$ is a member of the group consisting of lower alkyl, hydroxy-lower alkyl, lower alkenyl, lower alkynyl, phenyl, phenyl-lower alkyl, cyclopentyl and cyclohexyl, $R_3$ is a member of the group consisting of lower alkyl, hydroxy-lower alkyl, lower alkenyl, lower alkynyl, phenyl, cyclopentyl and cyclohexyl and the group

also represents a member of the group consisting of morpholino, pyrrolidino and piperidino, but $R_3$ is not lower alkyl when $R_2$ is phenyl-lower alkyl, and Z is a member of the group consisting of lower straight and branched alkylenes, and $R_4$ is a member of the group consisting of hydrogen and lower alkyls.

3. A compound of the formula

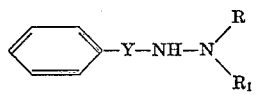

in which R and $R_1$ are lower alkyl and Y is lower alkylene having at least two carbons.

4. N,N-dimethyl-N'-(1-phenyl-2-propyl)-hydrazine.
5. N,N-dimethyl-N'-phenylethyl hydrazine.
6. N,N-diphenyl-N'-phenylpropyl hydrazine.
7. N,N-dicyclohexyl-N'-phenylhexyl hydrazine.
8. N,N-dimethyl-N'-methyl-N'-phenylethyl hydrazine.

References Cited by the Examiner

UNITED STATES PATENTS

| | | | |
|---|---|---|---|
| 2,305,748 | 12/42 | Vargha | 260—569 |
| 2,383,134 | 8/45 | Lacey et al. | 260—569 |
| 2,688,040 | 8/54 | Adams et al. | 260—569 |
| 2,784,141 | 3/57 | Jacobsen | 167—65 |
| 2,804,422 | 8/57 | Schumann | 167—65 |
| 2,818,367 | 12/57 | Jaworski et al. | 260—569 |
| 2,850,425 | 9/58 | Gaertner | 260—569 |
| 2,860,140 | 11/58 | Mertz | 260—288 |
| 2,892,841 | 6/59 | Rudner | 260—288 |
| 2,933,531 | 4/60 | Schumann | 260—569 |
| 2,933,532 | 4/60 | Schumann | 260—569 |

OTHER REFERENCES

Benoit: Bulletin de la Societe Chimique des France, pp. 242–244 (1947).

Biel et al.: J. Amer. Chem. Soc., vol. 81 (1959), pp. 2805–2813.

Class et al.: J. Amer. Chem. Soc., vol. 75 (1953), pp. 2937–2939.

Cole: "Therapeutic Efficacy of Antidepressant, Drugs," J.A.M.A., November 2, 1964, pages 448–455.

Goldberg: "Monoamine Oxidase Inhibitors," pages 456–462, Nov. 2, 1964.

Hinman: J. Amer. Chem. Soc., vol. 78 (1956), p. 1645.

Merrow et al.: J. Amer. Chem. Soc., vol. 76 (1954), pp. 4522–4525.

Mauerer et al.: Chemische Berichte, vol. 68 (1935), p. 2191.

Votocek et al.: Chemical Abstracts, vol. 30 (1936), p. 8172.

Votocek et al.: Chemical Abstracts, vol. 26 (1932), p. 5294.

CHARLES B. PARKER, *Primary Examiner.*

MORRIS O. WOLK, IRVING MARCUS, *Examiners.*

UNITED STATES PATENT OFFICE
CERTIFICATE OF CORRECTION

Patent No. 3,213,138                                         October 19, 1965

John H. Biel

It is hereby certified that error appears in the above numbered patent requiring correction and that the said Letters Patent should read as corrected below.

Column 2, line 10, for "1" read -- 2 --; line 14, for "3-methylene" read -- 3-methylbutylene --; column 4, line 64, for "dicyclohexy-" read -- dicyclohexyl- --; lines 65 and 74, for "dially-", each occurrence, read -- diallyl- --; column 5, lines 8 to 22, in the first compound of the formula, for that portion reading $$=R_4COA \longrightarrow \quad \text{read} \quad +R_4COA \longrightarrow$$

same column 5, lines 8 to 22, in the second compound of the formula, for that portion reading

same column 5, line 48, for "ethyl-N-" read -- ethyl-N'- --.

Signed and sealed this 21st day of June 1966.

(SEAL)
Attest:

ERNEST W. SWIDER                                   EDWARD J. BRENNER
Attesting Officer                                  Commissioner of Patents